(12) United States Patent
Yang et al.

(10) Patent No.: US 11,246,033 B2
(45) Date of Patent: Feb. 8, 2022

(54) AUTHENTICATION METHOD, AND RELATED DEVICE AND SYSTEM

(71) Applicant: HUAWEI TECHNOLOGIES CO., LTD., Guangdong (CN)

(72) Inventors: Hui Yang, Beijing (CN); Jingwen Nan, Beijing (CN); Wei Bai, Beijing (CN); Yizhen Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/090,001

(22) Filed: Nov. 5, 2020

(65) Prior Publication Data

US 2021/0058786 A1    Feb. 25, 2021

Related U.S. Application Data

(63) Continuation of application No. PCT/CN2019/085884, filed on May 7, 2019.

(30) Foreign Application Priority Data

May 10, 2018   (CN) .......................... 201810443968.X

(51) Int. Cl.
*H04W 12/069*   (2021.01)
*H04W 12/72*   (2021.01)
(Continued)

(52) U.S. Cl.
CPC ....... *H04W 12/069* (2021.01); *H04W 12/041* (2021.01); *H04W 12/108* (2021.01); *H04W 12/72* (2021.01)

(58) Field of Classification Search
CPC . H04W 12/069; H04W 12/72; H04W 12/108; H04W 12/041; H04W 12/10;
(Continued)

(56) References Cited

U.S. PATENT DOCUMENTS 10,123,202 B1 *  11/2018  Polehn ................ H04W 12/42
10,164,983 B2 *  12/2018  Chen .................... H04L 9/3236
(Continued)

FOREIGN PATENT DOCUMENTS

CA          3017858 A1      2/2017
CN        105553674 A       5/2016
(Continued)

OTHER PUBLICATIONS

Extended European Search Report issued in European Application No. 19799455.1 dated Feb. 12, 2021, 8 pages.
(Continued)

*Primary Examiner* — Techane Gergiso
(74) *Attorney, Agent, or Firm* — Fish & Richardson P.C.

(57) ABSTRACT

Example authentication methods and apparatus are described. One example method is applied to an identity management entity, and the identity management entity is deployed in a core network control plane of a Long-Term Evolution (LTE) network. The method includes receiving a certificate request message from terminal equipment and generating a digital certificate for the terminal equipment. An identity request message carrying the digital certificate is sent to an identity proxy entity, where the identity proxy entity is deployed in a blockchain network, and the identity request message is used to obtain a blockchain identity for the terminal equipment.

9 Claims, 5 Drawing Sheets

(51) Int. Cl.
*H04W 12/108* (2021.01)
*H04W 12/041* (2021.01)

(58) Field of Classification Search
CPC .. H04W 12/06; H04L 9/3263; H04L 2209/80; H04L 63/0435; H04L 63/0823; H04L 9/0822; H04L 63/123; H04L 9/0825; H04L 63/06; H04L 9/3239; H04L 9/3247; H04L 63/083; H04L 2209/38; H04L 9/32; H04L 29/06
See application file for complete search history.

(56) References Cited

U.S. PATENT DOCUMENTS

| | | |
|---|---|---|
| 2014/0201057 A1 | 7/2014 | Shuster |
| 2017/0091467 A1 | 3/2017 | Pogorelik et al. |
| 2017/0353320 A1 | 12/2017 | Yang |
| 2018/0374091 A1 | 12/2018 | Madisetti et al. |
| 2019/0124512 A1* | 4/2019 | Phan ................ H04W 12/04 |

FOREIGN PATENT DOCUMENTS

| | | |
|---|---|---|
| CN | 107079037 A | 8/2017 |
| CN | 107483198 A | 12/2017 |
| CN | 107528856 A | 12/2017 |
| CN | 107734502 A | 2/2018 |
| WO | 2018049656 A1 | 3/2018 |

OTHER PUBLICATIONS

Office Action issued in Chinese Application No. 201810443968.X dated Jun. 2, 2021, 7 pages (with English translation).

Office Action issued in Chinese Application No. 201810443968.X dated Apr. 17, 2020, 9 pages.

PCT International Search Report and Written Opinion issued in International Application No. PCT/CN2019/085884 dated Jul. 5, 2019, 17 pages (with English translation).

* cited by examiner

AUTHENTICATION METHOD, AND RELATED DEVICE AND SYSTEM

CROSS-REFERENCE TO RELATED APPLICATIONS

This application is a continuation of International Application No. PCT/CN2019/085884, filed on May 7, 2019, which claims priority to Chinese Patent Application No. 201810443968.X, filed on May 10, 2018. The disclosures of the aforementioned applications are hereby incorporated by reference in their entireties.

TECHNICAL FIELD

Embodiments of the present invention relate to the field of communications technologies, and in particular, to an authentication method, and a related device and system.

BACKGROUND

Terminal equipment (TE) is an indispensable electronic product in people's daily lives. Therefore, to facilitate people's lives, a geographical location of the TE is not fixed, but changes based on a requirement. However, when a geographical location of the TE changes, a service network of the TE may be switched from a long term evolution (LTE) network to a blockchain network. Because a communications protocol of the LTE network is different from a communications protocol of the blockchain network, to ensure fast switching of the TE from the LTE network to the blockchain network, integrating access authentication processes of the LIE network and the blockchain network becomes a technical problem to be urgently resolved.

SUMMARY

Embodiments of the present invention disclose an authentication method, and a related device and system, to integrate access authentication processes of an LTE network and a blockchain network.

A first aspect discloses an authentication method. The method is applied to an identity management entity, the identity management entity is deployed in a core network control plane of an LTE network, receives a certificate request message from TE, generates a digital certificate for the TE, and sends an identity request message carrying the digital certificate to an identity proxy entity, where the identity proxy entity is deployed in a blockchain network, and the identity request message is used to obtain a blockchain identity for the TE. It can be learned that when the TE is in the LTE network, the TE may obtain the blockchain identity from the identity proxy entity in the blockchain network by using the digital certificate issued by the identity management entity in the LTE network, so that the terminal equipment can communicate with the blockchain network by using the blockchain identity. In this way, access authentication processes of the LTE network and the blockchain network can be integrated.

In an embodiment, the identity management entity may first verify whether the certificate request message is a valid message, and generate a digital certificate for the TE only when the certificate request message is a valid message, to ensure that the TE that requests to access the blockchain network is a valid TE instead of an invalid TE.

In an embodiment, the certificate request message may carry an identifier of the TE, an encrypted identity signature, and an encrypted signature public key, to verify whether the certificate request message is a valid message. The encrypted identity signature and the encrypted signature public key may be decrypted by using a symmetric key, to obtain an identity signature and a signature public key of the TE. The identity signature is decrypted by using the signature public key, to obtain a decrypted identity signature of the TE. A hash operation is performed on the identifier to obtain a computation identity signature. Whether the decrypted identity signature is the same as the computation identity signature is determined, and when it is determined that the decrypted identity signature is the same as the computation identity signature, the certificate request message is determined to be a valid message. The signature public key is a key that is determined by the TE and that is used to decrypt the identity signature; the symmetric key is a key that is determined by the identity management entity and that is used to establish non-access stratum (NAS) communication; and the symmetric key includes at least one key.

In an embodiment, to generate a digital certificate for the TE, the identifier and the signature public key may be encrypted by using a certificate private key, to obtain a digital certificate. This may indicate that the digital certificate is a digital certificate of the TE. The certificate private key is a key that is determined by the identity management entity and that is used to generate the digital certificate.

In an embodiment, the identifier of the TE may be an international mobile subscriber identity (IMSI).

A second aspect discloses an identity management entity. The identity management entity includes units configured to perform the authentication method provided in any one of the first aspect or the possible implementations of the first aspect.

A third aspect provides an authentication method. The method is applied to an identity proxy entity. The identity proxy entity is deployed in a blockchain network, receives, from an identity management entity, an identity request message carrying a digital certificate, allocates a blockchain identity to terminal equipment based on the digital certificate, and sends the blockchain identity to the terminal equipment. It can be learned that when the TE is in the LTE network, the TE may obtain the blockchain identity from the identity proxy entity in the blockchain network by using the digital certificate issued by the identity management entity in the LTE network, so that the terminal equipment can communicate with the blockchain network by using the blockchain identity. In this way, access authentication processes of the LTE network and the blockchain network can be integrated. The identity management entity is deployed in a core network control plane of the LTE network, and the terminal equipment is the terminal equipment that requests blockchain network authentication.

In an embodiment, the identity proxy entity may first verify whether the digital certificate is a valid certificate, and a blockchain identity is allocated based on the digital certificate only when the digital certificate is a valid certificate. This can ensure that the digital certificate is issued by the identity management entity, thereby ensuring validity of authentication.

In an embodiment, the digital certificate may include an encrypted identifier and an encrypted signature public key of the TE, and the identity request message may further carry an identity signature of the TE to verify whether the digital certificate is a valid certificate. The digital certificate may be decrypted by using a certificate public key, to obtain an identifier and a signature public key of the TE. The identity signature is decrypted by using the signature public key, to obtain a decrypted identity signature of the TE. A hash operation is performed on the identifier to obtain a computation identity signature. Whether the decrypted identity signature is the same as the computation identity signature is determined, and when it is determined that the decrypted identity signature is the same as the computation identity signature, it is determined that the digital certificate is a valid certificate. The certificate public key is a key that is determined by the identity management entity and that is used to decrypt the digital certificate.

In an embodiment, the identity proxy entity may generate a blockchain identity, send a verification request message carrying the blockchain identity to a blockchain verification group, and receive a verification result from the blockchain verification group, and store the blockchain identity when the verification result is that the blockchain identity is a valid blockchain identity. This can ensure that the blockchain identity allocated by the identity proxy entity to the TE is a valid blockchain identity. The verification request message is used to verify validity of the blockchain identity.

In an embodiment, the identifier of the TE is an IMSI.

A fourth aspect discloses an identity proxy entity. The identity proxy entity includes units configured to perform the authentication method provided in any one of the third aspect or the possible implementations of the third aspect.

A fifth aspect discloses an authentication system. The system includes the identity management entity disclosed in the second aspect and the identity proxy entity disclosed in the fourth aspect.

A sixth aspect discloses a readable storage medium. The storage medium stores a program. When the program is run, the authentication method disclosed in any one of the first aspect or the possible implementations of the first aspect, or any one of the third aspect or the possible implementations of the third aspect is implemented.

A seventh aspect discloses a communications apparatus. The communications apparatus includes a processor, a memory, a receiver, and a transmitter. The memory is configured to store program code, the processor is configured to execute the program code, and the receiver and the transmitter are configured to communicate with another communications device. When the processor executes the program code stored in the memory, the processor is enabled to perform the authentication method disclosed in any one of the first aspect or the possible implementations of the first aspect, or any one of the third aspect or the possible implementations of the third aspect.

DESCRIPTION OF EMBODIMENTS

Embodiments of the present invention disclose an authentication method, and a related device and system, to integrate access authentication processes of an LTE network and a blockchain network. The following provides detailed descriptions.

Figure 1:
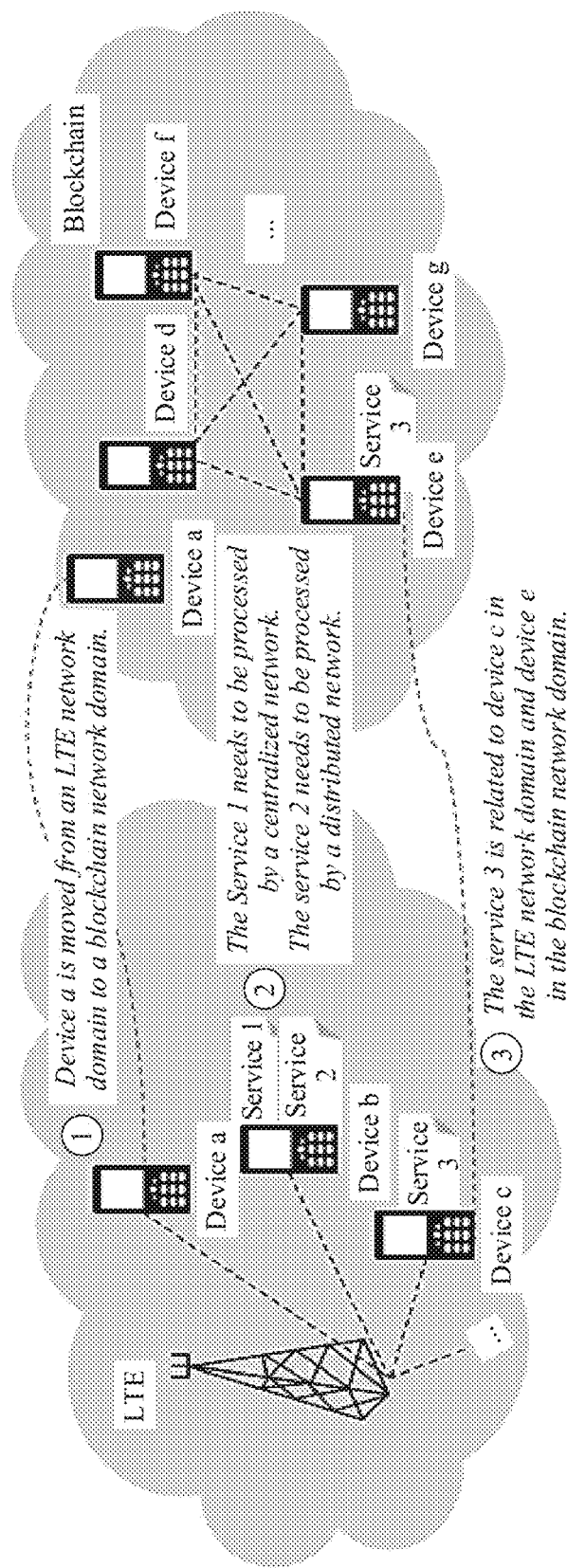
FIG. 1 is a schematic diagram of an application scenario according to an embodiment of the present invention.

To better understand the authentication method, and the related device and system that are disclosed in the embodiments of the present invention, the following first describes an application scenario used in the embodiments of the present invention. FIG. 1 is a schematic diagram of an application scenario according to an embodiment of the present invention. As shown in FIG. 1, scenario ① indicates that for a same device, because of the mobility of the device, a change of a geographical location of the device causes a change of a network responsible for providing a service; scenario ② indicates that for services carried on a device, some services may be provided by a centralized network, and some services may be provided by a distributed network with better performance, and users want to select a network that best meets their requirements based on the characteristics of different services; and scenario ③ indicates that for different devices, devices in different networks inevitably have a requirement for cross-network-domain communication because of a service. Therefore, to meet the requirements of the foregoing three scenarios, access authentication processes of an LTE network and a blockchain network need to be integrated.

Figure 2:
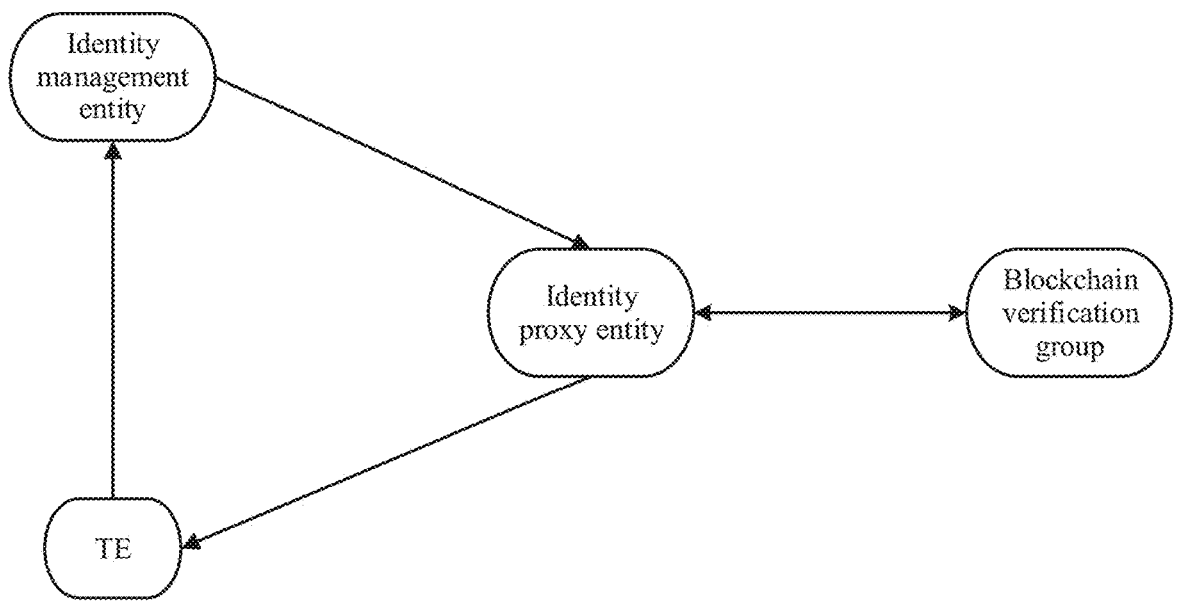
FIG. 2 is a schematic diagram of a network architecture according to an embodiment of the present invention.

To better understand the authentication method, and the related device and system that are disclosed in the embodiments of the present invention, the following first describes a network architecture used in the embodiments of the present invention. FIG. 2 is a schematic diagram of a network architecture according to an embodiment of the present invention. As shown in FIG. 2, the network architecture may include TE, an identity management entity, an identity proxy entity, and a blockchain verification group. The TE is configured to send a certificate request message to the identity management entity when the TE needs to switch from an LTE network to a blockchain network, needs to use both the LTE network and the blockchain network, or needs to communicate with a device in the blockchain network. The identity management entity is deployed in a core network control plane of the LTE network, and is configured to: receive the certificate request message from the TE, verify whether the certificate request message is a valid message, generate a digital certificate for the TE when it is determined through verification that the certificate request message is a valid message, and send an identity request message carrying the digital certificate to the identity proxy entity. The identity proxy entity is deployed in the blockchain network, and is configured to: receive, from the identity management entity, the identity request message carrying the digital certificate, verify whether the digital certificate is a valid certificate, allocate a blockchain identity to the TE based on the digital certificate when the digital certificate is a valid certificate, and send the blockchain identity to the TE. In addition, the identity proxy entity is further configured to: generate a blockchain identity, and send, to the blockchain verification group, a verification request message carrying the blockchain identity. The blockchain verification group includes at least two blockchain devices, and is configured to: receive the verification request message from the identity proxy entity, verify validity of the blockchain identity, and send a verification result to the identity proxy entity. The identity proxy entity is further configured to: receive the verification result from the blockchain verification group, and store the blockchain identity when the verification result is that the blockchain identity is a valid blockchain identity. The TE is further configured to: receive the blockchain identity from the identity proxy entity, and access the blockchain network based on the blockchain identity.

The TE may be a handheld terminal, a notebook computer, user equipment (UE), a subscriber unit, a cellular phone, a smartphone , a wireless data card, a personal digital assistant (PDA) computer, a tablet computer, a wireless modem, a handheld device, a laptop computer, a cordless phone or a wireless local loop (WLL) station, a machine type communication (MTC) terminal, or other devices that can access the network.

Figure 3:
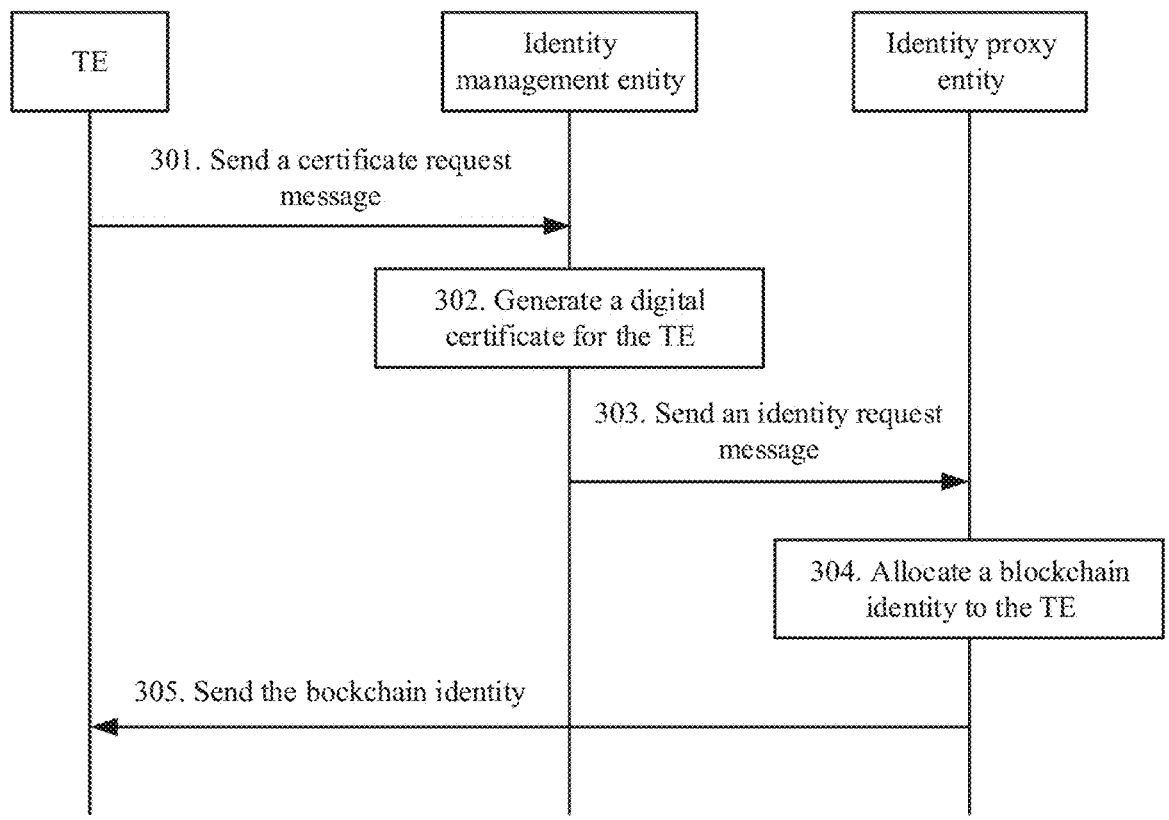
FIG. 3 is a schematic flowchart of an authentication method according to an embodiment of the present invention.

Based on the network architecture shown in FIG. 2, FIG. 3 is a schematic flowchart of an authentication method according to an embodiment of the present invention. As shown in FIG. 3, the authentication method may include the following steps.

301. TE sends a certificate request message to an identity management entity.

In this embodiment, when the TE needs to switch from an LTE network to a blockchain network, needs to use both the LTE network and the blockchain network, or needs to communicate with a device in the blockchain network, the TE sends a certificate request message to the identity management entity, and the certificate request message may be sent through a NAS message.

302. The identity management entity generates a digital certificate for the TE.

303. The identity management entity sends an identity request message carrying the digital certificate to an identity proxy entity.

In this embodiment, after generating the digital certificate for the TE, the identity management entity sends the identity request message carrying the digital certificate to the identity proxy entity, where the identity request message may be sent through the NAS message.

304. The identity proxy entity allocates a blockchain identity to the TE based on the digital certificate.

In this embodiment, after receiving the identity request message from the identity management entity, the identity proxy entity allocates the blockchain identity to the TE based on the digital certificate. The blockchain identity is a unique identifier of the TE in the blockchain network, and can ensure traceability of the TE in the blockchain.

305. The identity proxy entity sends the blockchain identity to the TE.

In this embodiment, after allocating the blockchain identity to the TE based on the digital certificate, the identity proxy entity sends the blockchain identity to the TE, so that the TE accesses the blockchain network based on the blockchain identity.

In the authentication method described in FIG. 3, when the TE is in the LTE network, the TE may obtain the blockchain identity from the identity proxy entity in the blockchain network by using the digital certificate issued by the identity management entity in the LTE network, so that the terminal equipment can communicate with the blockchain network by using the blockchain identity. In this way, access authentication processes of the LTE network and the blockchain network can be integrated.

Figure 4:
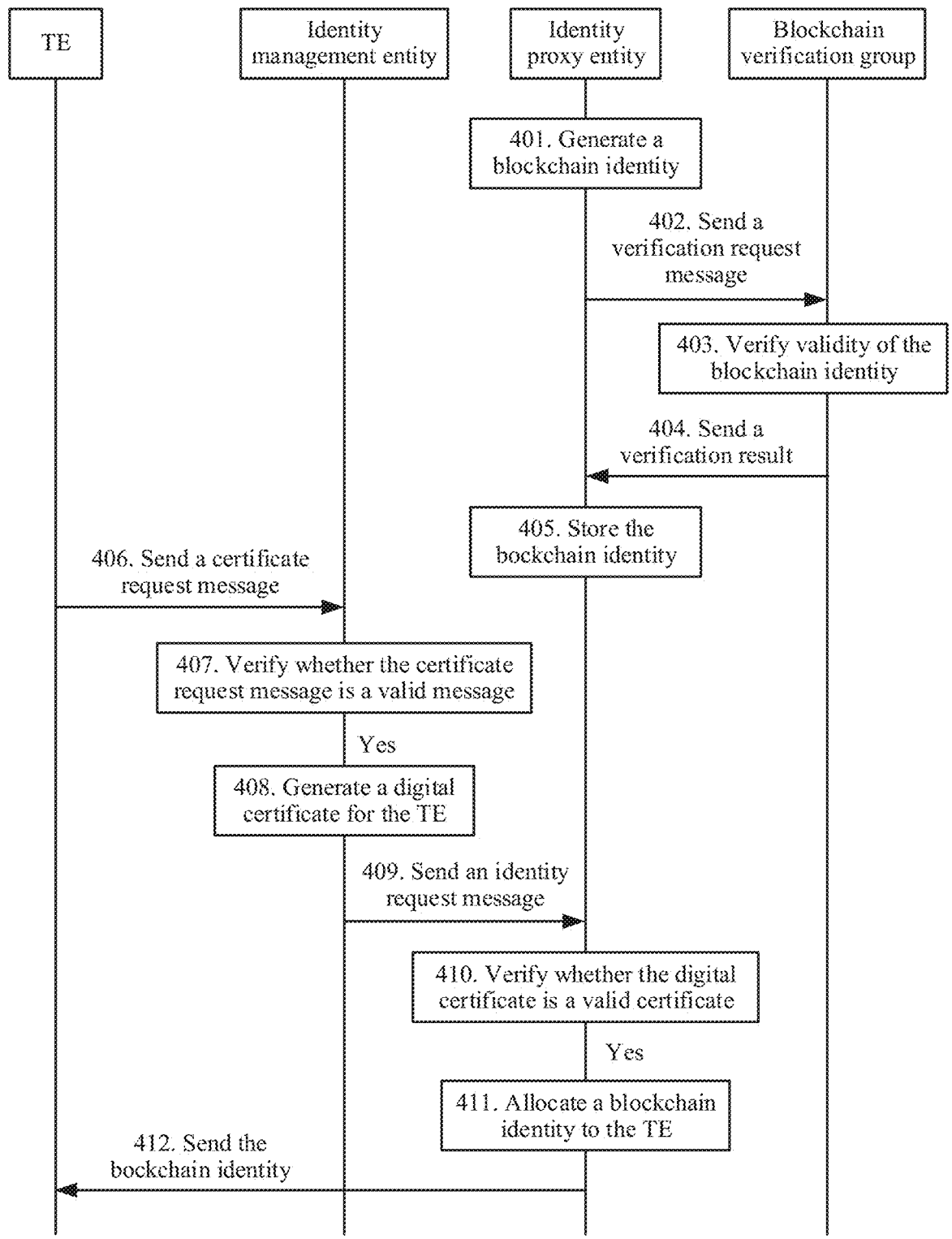
FIG. 4 is a schematic flowchart of another authentication method according to an embodiment of the present invention.

Based on the network architecture shown in FIG. 2, FIG. 4 is a schematic flowchart of another authentication method according to an embodiment of the present invention. As shown in FIG. 4, the authentication method may include the following steps.

401. An identity proxy entity generates a blockchain identity.

In this embodiment, when a buffer of the identity proxy entity does not overflow, the identity proxy entity generates the blockchain identity. When the buffer of the identity proxy entity overflows, step 401 to step 405 are not performed.

402. The identity proxy entity sends a verification request message carrying the blockchain identity to a blockchain verification group.

In this embodiment, after generating the blockchain identity, the identity proxy entity sends the verification request message carrying the blockchain identity to the blockchain verification group, and the verification request message may be sent to the blockchain verification group in a broadcast manner.

403. The blockchain verification group verifies validity of the blockchain identity.

In this embodiment, after receiving the verification request message from the identity proxy entity, the blockchain verification group verifies the validity of the blockchain identity, to be specific, each blockchain device in the blockchain verification group determines whether the blockchain identity appears in a block. When a blockchain device in the blockchain verification group determines that the blockchain identity appears in the block, it indicates that the blockchain identity is a duplicate blockchain identity, and the blockchain identity is an invalid blockchain identity. When all blockchain devices in the blockchain verification group determine that the blockchain identity does not appear in the block, it indicates that the blockchain identity is a valid blockchain identity.

404. The blockchain verification group sends a verification result to the identity proxy entity.

In this embodiment, after verifying validity or invalidity of the blockchain identity, the blockchain verification group sends the verification result to the identity proxy entity. The verification result may be sent by a head node in the blockchain verification group to the identity proxy entity.

405. When the verification result is that the blockchain identity is a valid blockchain identity, the identity proxy entity stores the blockchain identity.

In this embodiment, after receiving the verification result from the blockchain verification group, the identity proxy entity identifies the verification result. When the verification result is that the blockchain identity is a valid blockchain identity, the identity proxy entity stores the blockchain identity, that is, stores the blockchain identity in the buffer. When the verification result is that the blockchain identity is an invalid blockchain identity, the identity proxy entity discards the blockchain identity.

406. The TE sends a certificate request message to an identity management entity Step 406 is the same as step 301. For detailed descriptions, refer to step 301. Details are not described herein again.

407. The identity management entity verifies whether the certificate request message is a valid message; when it is determined through verification that the certificate request message is a valid message, performs step 408; and when it is determined through verification that the certificate request message is an invalid message, the process ends.

In this embodiment, the certificate request message may carry an identifier, an encrypted identity signature, and an encrypted signature public key of the TE. After receiving the certificate request message from the TE, the identity management entity may first verify whether the certificate request message is a valid message, and may first decrypt the encrypted identity signature and the encrypted signature public key by using a symmetric key, to obtain an identity signature and a signature public key of the TE; decrypt the identity signature by using the signature public key, to obtain a decrypted identity signature of the TE; perform a hash operation on the identifier to obtain a computation identity signature; determine whether the decrypted identity signature is the same as the computation identity signature; and when determining that the decrypted identity signature is the same as the computation identity signature, determine that the certificate request message is a valid message, and perform step 408. When it is determined that the decrypted identity signature is different from the computation identity signature, it is determined that the certificate request message is an invalid message. Therefore, the certificate request message is discarded and the process ends. The identifier of the TE may be an IMSI, the symmetric key is a key that is determined by the identity management entity and that is used to establish NAS communication, and the symmetric key includes at least one key. The signature public key of the TE is a key that is determined by the TE and that is used to decrypt the identity signature of the TE. The identity signature of the TE is obtained after a hash operation is performed on the identifier of the TE and then the identifier is encrypted by using a signature private key of the TE. The signature private key of the TE is a key that is determined by the TE and that is used to encrypt the identifier of the TE after the hash operation.

408. The identity management entity generates a digital certificate for the TE.

In this embodiment, when determining through verification that the certificate request message is a valid message, the identity management entity generates the digital certificate for the TE, and may encrypt the identifier and the signature public key of the TE by using a certificate private key, to obtain the digital certificate. The certificate private key is a key that is determined by the identity management entity and that is used to generate the digital certificate.

409. The identity management entity sends an identity request message carrying the digital certificate to the identity proxy entity.

Step 409 is the same as step 303. For detailed descriptions, refer to step 303. Details are not described herein again.

410. The identity proxy entity verifies whether the digital certificate is a valid certificate; and when the digital certificate is a valid certificate, performs step 411.

In this embodiment, the digital certificate may include an encrypted identifier and an encrypted signature public key of the TE, and the identity request message further carries the identity signature of the TE. After receiving the identity request message from the identity management entity, the identity proxy entity verifies whether the digital certificate is a valid certificate. The identity proxy entity may first decrypt the digital certificate by using a certificate public key, to obtain the identifier and the signature public key of the TE; decrypt the identity signature by using the signature public key, to obtain a decrypted identity signature of the TE; perform a hash operation on the identifier to obtain a computation identity signature; determine whether the decrypted identity signature is the same as the computation identity signature; perform step 411 when determining that the decrypted identity signature is the same as the computation identity signature; and determine that the digital certificate is an invalid certificate when determining that the decrypted identity signature is different from the computation identity signature, and discard the digital certificate, and step 401 to step 405 may be performed. The certificate public key is a key that is determined by the identity management entity and that is used to decrypt the digital certificate.

411. The identity proxy entity allocates the blockchain identity to the TE.

In this embodiment, when the verification result is that the digital certificate is a valid certificate, the identity proxy entity allocates the blockchain identity to the TE, that is, selects an unallocated blockchain identity from blockchain identities stored in the buffer and allocates the unallocated blockchain identity to the TE. Step 401 to step 405 and step 406 to step 410 may be performed in parallel, or may be performed in sequence, provided that it is ensured that an unallocated blockchain identity exists in the buffer of the identity proxy entity when step 411 is performed.

412. Identity proxy entity sends the blockchain identity to the TE.

Step 412 is the same as step 305. For detailed descriptions, refer to step 305. Details are not described herein again.

In the authentication method described in FIG. 4, when the TE is in an LTE network, the TE may obtain a valid blockchain identity from the identity proxy entity in the blockchain network by using the digital certificate issued by the identity management entity in the LTE network, so that the terminal equipment can communicate with the blockchain network by using the blockchain identity. In this way, access authentication processes of the LTE network and the blockchain network can be integrated.

Figure 5:
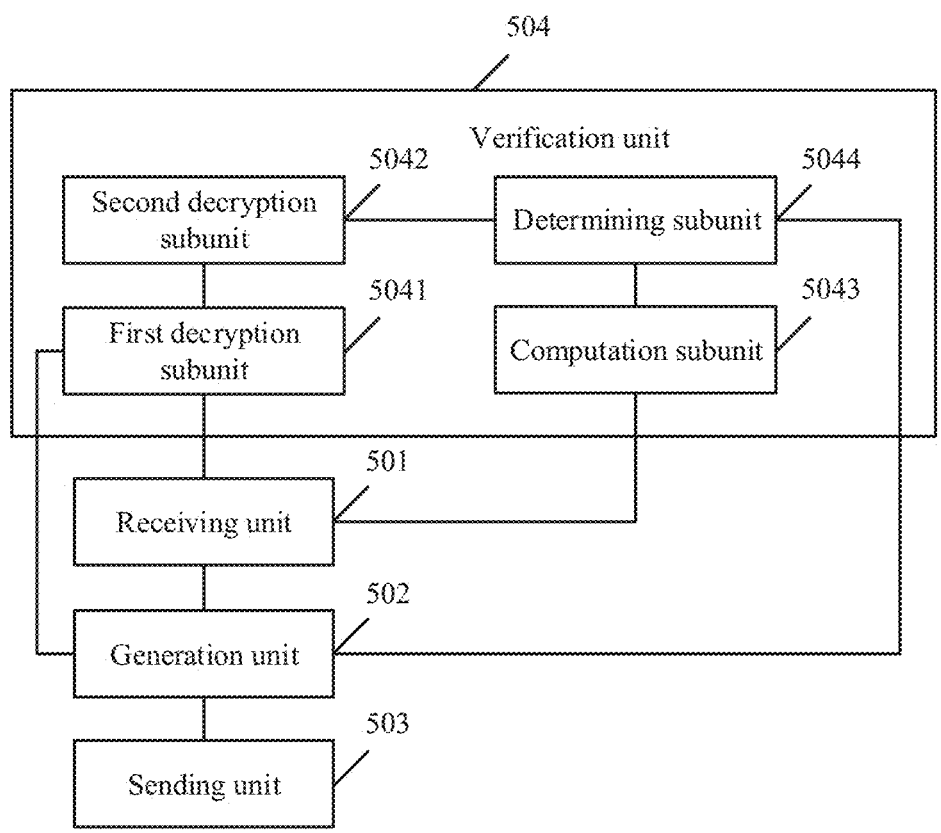
FIG. 5 is a schematic structural diagram of an identity management entity according to an embodiment of the present invention.

Based on the network architecture shown in FIG. 2, FIG. 5 is a schematic structural diagram of an identity management entity according to an embodiment of the present invention. The identity management entity is deployed in a core network control plane of an LTE network. As shown in FIG. 5, the identity management entity may include:

a receiving unit 501, configured to receive a certificate request message from TE;

a generation unit 502, configured to generate a digital certificate for the TE; and a sending unit 503, configured to send an identity request message carrying the digital certificate generated by the generation unit 502 to an identity proxy entity, where the identity proxy entity is deployed in a blockchain network, and the identity request message is used to obtain a blockchain identity for the TE.

The generation unit 502 is configured to generate the digital certificate for the TE based on the certificate request message received by the receiving unit 501.

In a possible implementation, the identity management entity may further include:

a verification unit 504, configured to: verify whether the certificate request message received by the receiving unit 501 is a valid message, and when the verification unit 504 determines through verification that the certificate request message is a valid message, trigger the generation unit 502 to generate the digital certificate for the TE.

In a possible implementation, the certificate request message carries an identifier, an encrypted identity signature, and an encrypted signature public key of the TE.

The verification unit 504 may include:

a first decryption subunit 5041, configured to decrypt, by using a symmetric key, the encrypted identity signature and the encrypted signature public key that are received by the receiving unit 501, to obtain an identity signature and a signature public key of the TE, where the symmetric key is a key that is determined by the identity management entity and that is used to establish non-access stratum NAS communication;

a second decryption subunit 5042, configured to decrypt the identity signature by using the signature public key obtained by the first decryption subunit 5041, to obtain a decrypted identity signature of the TE;

a computation subunit 5043, configured to perform a hash operation on the identifier received by the receiving unit 501, to obtain a computation identity signature; and a determining subunit 5044, configured to: determine whether the decrypted identity signature obtained by the second decryption subunit 5042 is the same as the computation identity signature obtained by the computation subunit 5043, and when the determining subunit 5044 determines that the decrypted identity signature obtained by the second decryption subunit 5042 is the same as the computation identity signature obtained by the computation subunit 5043, determine that the certificate request message received by the receiving unit 501 is a valid message.

In a possible implementation, the generation unit 502 is specifically configured to encrypt, by using a certificate private key, the identifier received by the receiving unit 501 and the signature public key obtained by the first decryption subunit 5041, to obtain the digital certificate, where the certificate private key is a key that is determined by the identity management entity and that is used to generate the digital certificate.

In a possible implementation, the identifier of the TE may be an IMSI.

In addition, the identity management entity may further perform the steps in the method that are performed by the identity management entity in FIG. 3 and FIG. 4, and may further include other units that perform the steps in the method that are performed by the identity management entity in FIG. 3 and FIG. 4. Details are not described herein.

Figure 6:
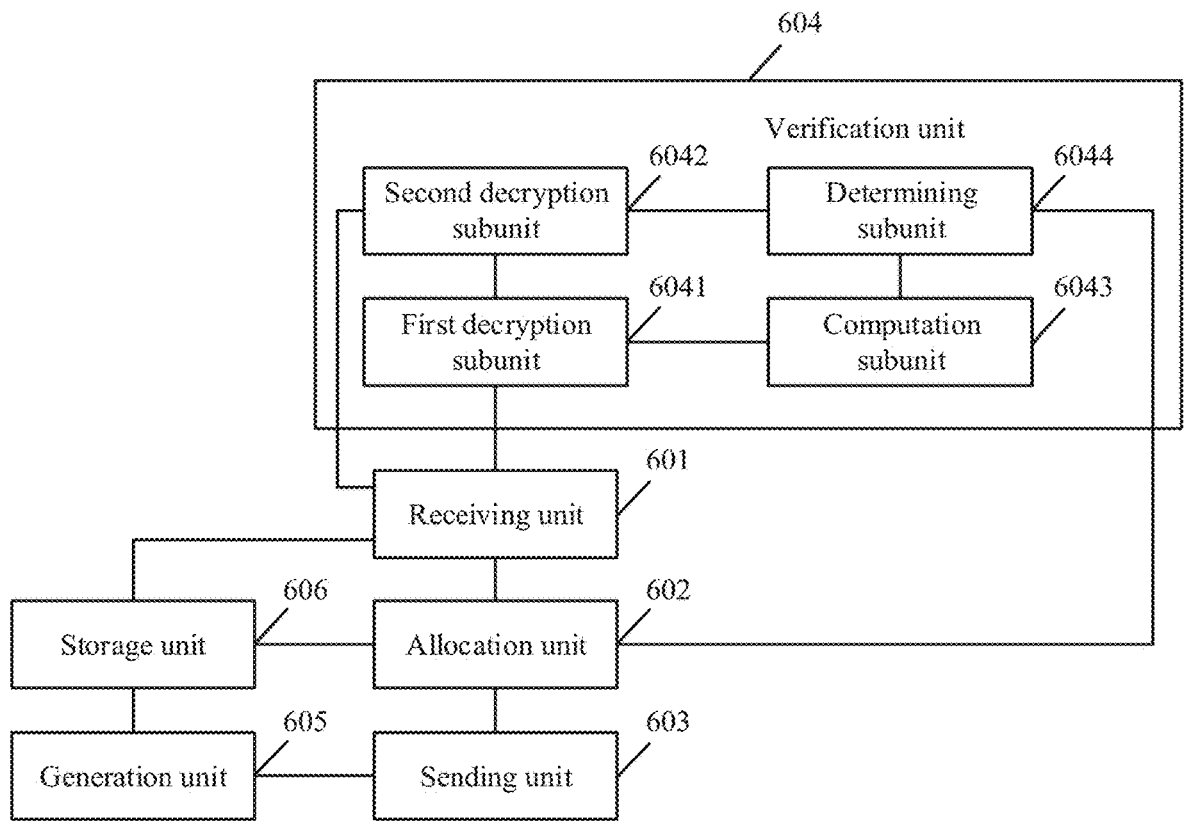
FIG. 6 is a schematic structural diagram of an identity proxy entity according to an embodiment of the present invention.

Based on the network architecture shown in FIG. 2, FIG. 6 is a schematic structural diagram of an identity proxy entity according to an embodiment of the present invention. The identity proxy entity is deployed in a blockchain network. As shown in FIG. 6, the identity proxy entity may include:

a receiving unit 601, configured to receive, from an identity management entity, an identity request message carrying a digital certificate, where the identity management entity is deployed in a core network control plane of an LTE network;

an allocation unit 602, configured to allocate a blockchain identity to TE based on the digital certificate received by the receiving unit 601, where the TE is the TE that requests blockchain network authentication; and a sending unit 603, configured to send, to the TE, the blockchain identity allocated by the allocation unit 602.

In a possible implementation, the identity proxy entity may further include:

a verification unit 604, configured to: verify whether the digital certificate received by the receiving unit 601 is a valid certificate, and when the verification unit 604 determines through verification that the digital certificate is a valid certificate, trigger the allocation unit 602 to allocate the blockchain identity to the TE based on the digital certificate.

In a possible implementation, the digital certificate may include an encrypted identifier and an encrypted signature public key of the TE, and the identity request message further carries an identity signature of the TE.

The verification unit 604 may include:

a first decryption subunit 6041, configured to decrypt, by using a certificate public key, the digital certificate received by the receiving unit 601, to obtain an identifier and a signature public key of the TE, where the certificate public key is a key that is determined by the identity management entity and that is used to decrypt the digital certificate;

a second decryption subunit 6042, configured to decrypt, by using the signature public key obtained by the first decryption subunit 6041, the identity signature received by the receiving unit 601, to obtain a decrypted identity signature of the TE;

a computation subunit 6043, configured to perform a hash operation on the identifier obtained by the first decryption subunit 6041, to obtain a computation identity signature; and a determining subunit 6044, configured to: determine whether the decrypted identity signature obtained by the second decryption subunit 6042 is the same as the computation identity signature obtained by the computation subunit 6043, and when the determining subunit 6044 determines that the decrypted identity signature obtained by the second decryption subunit 6042 is the same as the computation identity signature obtained by the computation subunit 6043, determine that the digital certificate is a valid certificate.

In a possible implementation, the identity proxy entity may further include:

a generation unit 605, configured to generate a blockchain identity, where the sending unit 603 is further configured to send a verification request message carrying the blockchain identity generated by the generation unit 605 to a blockchain verification group, where the verification request message is used to verify validity of the blockchain identity;

the receiving unit 601 is further configured to receive a verification result from the blockchain verification group; and a storage unit 606, configured to: when the verification result received by the receiving unit 601 is that the blockchain identity is a valid blockchain identity, store the blockchain identity generated by the generation unit 605.

The allocation unit 602 is configured to allocate, to the TE based on the digital certificate, a blockchain identity stored in the storage unit 606.

In a possible implementation, the identifier of the TE is an IMSI.

In addition, the identity proxy entity may further perform the steps in the method that are performed by the identity proxy entity in FIG. 3 and FIG. 4, and may further include other units that perform the steps in the method that are performed by the identity proxy entity in FIG. 3 and FIG. 4. Details are not described herein.

Figure 7:
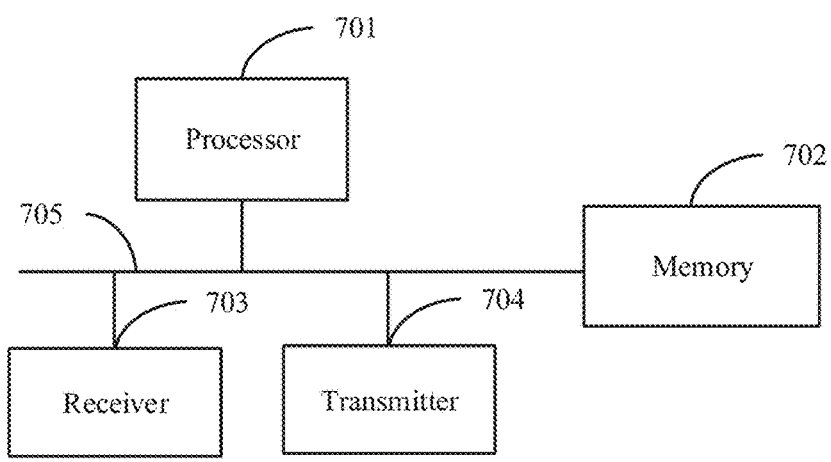
FIG. 7 is a schematic structural diagram of a communications apparatus according to an embodiment of the present invention.

Based on the network architecture shown in FIG. 2, FIG. 7 is a schematic structural diagram of a communications apparatus according to an embodiment of the present invention. As shown in FIG. 7, the communications apparatus may include a processor 701, a memory 702, a receiver 703, a transmitter 704, and a bus 705. The processor 701 may be a general-purpose central processing unit (CPU), a plurality of CPUs, a microprocessor, an application-specific integrated circuit (ASIC), or one or more integrated circuits that are configured to control program execution of solutions in the present invention. The memory 702 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM), or other compact disc storage, optical disc storage (including a compact disc, a laser disc, an optical disc, a digital versatile disc, and a Blu-ray disc, or the like), and a disk storage medium or another disk storage device, or any other medium that can be used to carry or store expected program code that has an instruction or data structure form and that can be accessed by a computer, but this is not limited herein. The memory 702 may exist alone, and the bus 705 is connected to the processor 701. The memory 702 may be integrated with the processor 701. The bus 705 may include a path, configured to transmit information among the foregoing components.

In an embodiment, the communications apparatus may be an identity management entity deployed in a core network control plane of an LTE network.

The receiver 703 is configured to receive a certificate request message from the TE and send the certificate request message to the processor 701.

The memory 702 stores a group of program code, and the processor 701 is configured to invoke the program code stored in the memory 702 to perform the following operation:

generating a digital certificate for the TE.

The transmitter 704 is configured to send an identity request message carrying the digital certificate to an identity proxy entity, where the identity proxy entity is deployed in a blockchain network, and the identity request message is used to obtain a blockchain identity for the TE.

In a possible implementation, the processor 701 is further configured to invoke the program code stored in the memory 702 to perform the following operation:

verifying whether the certificate request message is a valid message, and when the certificate request message is a valid message, performing the step of generating a digital certificate for the TE.

In a possible implementation, the certificate request message carries an identifier, an encrypted identity signature, and an encrypted signature public key of the TE.

That the processor 701 verifies whether the certificate request message is a valid message includes:

decrypting the encrypted identity signature and the encrypted signature public key by using a symmetric key, to obtain an identity signature and a signature public key of the TE, where the symmetric key is a key that is determined by the identity management entity and that is used to establish NAS communication;

decrypting the identity signature by using the signature public key, to obtain a decrypted identity signature of the TE;

performing a hash operation on the identifier to obtain a computation identity signature; and determining the decrypted identity signature is the same as the computation identity signature, and when determining that the decrypted identity signature is the same as the computation identity signature, determining that the certificate request message is a valid message.

In a possible implementation, that the processor 701 generates a digital certificate for the TE includes:

encrypting the identifier and the signature public key by using a certificate private key, to obtain the digital certificate, where the certificate private key is a key that is determined by the identity management entity and that is used to generate the digital certificate.

In a possible implementation, the identifier of the TE is an IMSI.

In another embodiment, the communications apparatus may be an identity proxy entity deployed in a blockchain network.

The receiver 703 is configured to: receive, from an identity management entity, the identity request message carrying the digital certificate, and send the identity request message to the processor 701, where the identity management entity is deployed in a core network control plane of an LTE network.

The memory 702 stores a group of program code, and the processor 701 is configured to invoke the program code stored in the memory 702 to perform the following operation:

allocating the blockchain identity to the TE based on the digital certificate, where the TE is the TE that requests a blockchain network authentication; and The transmitter 704 is configured to send the blockchain identity to the TE.

In a possible implementation, the processor 701 is further configured to invoke the program code stored in the memory 702, to perform the following operations:

verifying whether the digital certificate is a valid certificate, and when the digital certificate is a valid certificate, performing the step of allocating the blockchain identity to the TE based on the digital certificate.

In a possible implementation, the digital certificate may include an encrypted identifier and an encrypted signature public key of the TE, and the identity request message further carries an identity signature of the TE.

That the processor 701 verifies whether the digital certificate is a valid certificate includes:

decrypting the digital certificate by using a certificate public key, to obtain an identifier and a signature public key of the TE, where the certificate public key is a key that is determined by the identity management entity and that is used to decrypt the digital certificate;

decrypting the identity signature by using the signature public key, to obtain a decrypted identity signature of the TE;

performing a hash operation on the identifier to obtain a computation identity signature; and determining whether the decrypted identity signature is the same as the computation identity signature, and when determining that the decrypted identity signature is the same as the computation identity signature, determining that the digital certificate is a valid certificate.

In a possible implementation, the processor 701 is further configured to invoke the program code stored in the memory 702, to perform the following operation:

generating a blockchain identity.

The transmitter 704 is further configured to send a verification request message carrying the blockchain identity to a blockchain verification group, where the verification request message is used to verify validity of the blockchain identity.

The receiver 703 is further configured to receive a verification result from the blockchain verification group and send the verification result to the processor 701.

The processor 701 is further configured to invoke the program code stored in the memory 702 to perform the following operation:

when the verification result is that the blockchain identity is a valid blockchain identity, storing the blockchain identity.

In a possible implementation, the identifier of the TE is an IMSI.

An embodiment further discloses an authentication system. The authentication system may include the identity management entity in FIG. 5 and the identity proxy entity in FIG. 6.

An embodiment of the present invention further discloses a readable storage medium. The readable storage medium stores program code used by an identity management entity and/or an identity proxy entity to perform the authentication method shown in FIG. 3 and FIG. 4.

A person skilled in the art should be aware that in the foregoing one or more examples, functions described in the present invention may be implemented by hardware, software, firmware, or any combination thereof. When the embodiments of this application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another place. The storage medium may be any available medium accessible to a general-purpose or dedicated computer.

The objectives, the technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. An authentication method, wherein the method is applied to an identity management entity, wherein the identity management entity is deployed in a core network control plane of a Long-Term Evolution (LTE) network, and wherein the method comprises:
   receiving a certificate request message from a terminal equipment, wherein the certificate request message carries an identifier of the terminal equipment, an encrypted identity signature, and an encrypted signature public key;
   verifying whether the certificate request message is a valid message, wherein the verifying whether the certificate request message is a valid message comprises:
      decrypting the encrypted identity signature and the encrypted signature public key using a symmetric key to obtain an identity signature and a signature public key of the terminal equipment, wherein the symmetric key is a key that is determined by the identity management entity and that is used to establish non-access stratum (NAS) communication;
      decrypting the identity signature using the signature public key to obtain a decrypted identity signature of the terminal equipment;
      performing a hash operation on the identifier to obtain a computation identity signature;
      determining whether the decrypted identity signature is the same as the computation identity signature; and
      when determining that the decrypted identity signature is the same as the computation identity signature, determining that the certificate request message is a valid message;
   when the certificate request message is a valid message, generating a digital certificate for the terminal equipment; and
   sending an identity request message carrying the digital certificate to an identity proxy entity, wherein the identity proxy entity is deployed in a blockchain network, and wherein the identity request message is used to obtain a blockchain identity for the terminal equipment.

2. The method according to claim 1, wherein the generating a digital certificate for the terminal equipment comprises:
   encrypting the identifier and the signature public key by using a certificate private key to obtain a digital certificate, wherein the certificate private key is a key that is determined by the identity management entity and that is used to generate the digital certificate.

3. The method according to claim 1, wherein the identifier is an international mobile subscriber identity (IMSI).

4. An authentication method, wherein the method is applied to an identity proxy entity, wherein the identity proxy entity is deployed in a blockchain network, and wherein the method comprises:
   receiving, from an identity management entity, an identity request message carrying a digital certificate, wherein the identity management entity is deployed in a core network control plane of a Long-Term Evolution (LTE) network, wherein the digital certificate comprises an encrypted identifier and an encrypted signature public key of a terminal equipment, and wherein the identity request message further carries an identity signature of the terminal equipment;
   verifying whether the digital certificate is a valid certificate, wherein the verifying whether the digital certificate is a valid certificate comprises:
      decrypting the digital certificate using a certificate public key to obtain an identifier and a signature public key of the terminal equipment, wherein the certificate public key is a key that is determined by the identity management entity and that is used to decrypt the digital certificate;
      decrypting the identity signature using the signature public key to obtain a decrypted identity signature of the terminal equipment;
      performing a hash operation on the identifier to obtain a computation identity signature;
      determining whether the decrypted identity signature is the same as the computation identity signature; and
      when determining that the decrypted identity signature is the same as the computation identity signature, determining that the digital certificate is a valid certificate;
   when the digital certificate is a valid certificate, allocating a blockchain identity to terminal equipment based on the digital certificate, wherein the terminal equipment is a terminal equipment that requests blockchain network authentication; and
   sending the blockchain identity to the terminal equipment.

5. The method according to claim 4, wherein the method further comprises:
   generating a blockchain identity;
   sending a verification request message carrying the blockchain identity to a blockchain verification group, wherein the verification request message is used to verify validity of the blockchain identity;
   receiving a verification result from the blockchain verification group; and when the verification result is that the blockchain identity is a valid blockchain identity, storing the blockchain identity.

6. The method according to claim 5, wherein the identifier is an international mobile subscriber identity (IMSI).

7. An identity management entity, wherein the identity management entity is deployed in a core network control plane of a Long-Term Evolution (LTE) network, and wherein the identity management entity comprises:
  at least one processor; and
  a non-transitory computer-readable storage medium coupled to the at least one processor and storing programming instructions for execution by the at least one processor, wherein the programming instructions, when executed by the at least one processor, instruct the at least one processor to:
    receive a certificate request message from terminal equipment, wherein the certificate request message carries an identifier, an encrypted identity signature, and an encrypted signature public key of the terminal equipment;
    verify whether the certificate request message is a valid message, wherein the verify whether the certificate request message is a valid message comprises:
      decrypt, using a symmetric key, the encrypted identity signature and the encrypted signature public key to obtain an identity signature and a signature public key of the terminal equipment, wherein the symmetric key is a key that is determined by the identity management entity and that is used to establish non-access stratum (NAS) communication;
      decrypt the identity signature using the signature public key to obtain a decrypted identity signature of the terminal equipment;
      perform a hash operation on the identifier to obtain a computation identity signature;
      determine whether the decrypted identity signature is the same as the computation identity signature; and
      when determining that the decrypted identity signature is the same as the computation identity signature, determine that the certificate request message is a valid message;
    when determining through verification that the certificate request message is a valid message, generate a digital certificate for the terminal equipment; and
    send an identity request message carrying the digital certificate to an identity proxy entity, wherein the identity proxy entity is deployed in a blockchain network, and wherein the identity request message is used to obtain a blockchain identity for the terminal equipment.

8. The identity management entity according to claim 7, wherein the programming instructions further instruct the at least one processor to:
  encrypt, using a certificate private key, the identifier and the signature public key to obtain the digital certificate, wherein the certificate private key is a key that is determined by the identity management entity and that is used to generate the digital certificate.

9. The identity management entity according to claim 7, wherein the identifier is an international mobile subscriber identity (IMSI).

* * * * *